Nov. 6, 1962 R. B. ATKINSON 3,063,052

FERROGRAPHIC RECORDING HEAD

Filed March 14, 1955

INVENTOR.
RALPH B. ATKINSON
BY Zulwider Mattingly & Huntley
Attorneys

United States Patent Office 3,063,052
Patented Nov. 6, 1962

3,063,052
FERROGRAPHIC RECORDING HEAD

Ralph B. Atkinson, 9435 Lloydcrest Drive, Beverly Hills, Calif.

Filed Mar. 14, 1955, Ser. No. 493,950
17 Claims. (Cl. 346—74)

My invention relates generally to image reproduction and more particularly to recording apparatus for producing magnetic images by a system generally known as ferrography.

In the system of ferrography, as disclosed in previous patent applications, an electrical signal of varying strength is provided in some suitable manner, such as by scanning an object or an image with a photocell in a series of parallel lines or sweeps. This electrical signal is used to produce a magnetic field that is simultaneously swept across a magnetizable member, such as a sheet of magnetic material, to locally magnetize the sheet in synchronism and in accordance with the variations in the electrical signal. Thus, there will be produced in the sheet a magnetic image or replica of the original image.

Various forms of recording devices have been used, and the nature of these varies with the particular requirements of the situation. Thus, in some cases, a magnetizable sheet is wrapped around a mandrel and a magnetic recording head is moved axially along the mandrel as the latter is turned, thereby producing a generally helical path. When the recording has been completed, the magnetic sheet is removed from the mandrel, and is then immersed or otherwise suitably treated with a magnetic ink material which has the property of adhering most strongly to the portions of the sheet that are most strongly magnetized. The excess ink material is removed by suitable means such as mechanical brushing or agitation, and the resulting magnetic record is thus clearly optically visible.

One of the objections to such a method and apparatus for producing the magnetic image is that the use of the mandrel does not permit the continuous recording of a large amount of data, such as would be secured by recording upon tape fed from a large reel. Furthermore, none of the recording is visible until the entire sheet upon the mandrel has been recorded. To overcome these difficulties, a continuous roll of material can be fed through a recording means that, in effect, sweeps across the width of the tape. One such form of device makes use of a rotating helix that bears against the tape and forces it against a single transversely extending recording bar. While this form of apparatus is often very satisfactory, there are problems encountered in its design and use, and it is occasionally necessary to have greater definition than can be readily obtained by such a device.

Consequently, it is a major object of this invention to provide a ferrographic recording apparatus of improved design.

Another object of the invention is to provide a ferrographic recording apparatus capable of producing images of substantially increased definition.

It is a further object of the invention to provide a ferrographic recording apparatus especially adapted for producing images on a moving web or tape of considerable length.

Still another object of the invention is the provision of a ferrographic recording apparatus as in the foregoing wherein the web or strip of magnetic material is not contacted by any rapidly moving parts so that the possibility of damage to the magnetizable strip or web is minimized or entirely eliminated.

It is a still further object of the invention to provide apparatus of the class described that is comparatively simple and yet rugged in construction so as to reduce service and maintenance problems to a minimum.

The above and other objects of the invention are attained generally by providing a stationary recording member of substantially U-shaped transverse cross-section which, in the direction of its length, is composed of a plurality of pairs of thin laminations of magnetic material interlaminated with thin non-magnetic elements. The members of each pair of magnetic laminations are aligned and substantially coplanar, with a small gap, in the base of the U, separating them. The gaps of all of the pairs are aligned longitudinally of the member so that the latter appears as a single U-shaped block having a gap in the base of the U that extends the full length of the block. Actually, the block is of laminated construction, as described. A strip or web of magnetizable material, e.g. magnetic tape, bears against the member in a manner to bridge all the individual gaps, and during operation of the device, the tape is fed past the member at a constant speed.

A rotatable disc or the like is mounted to have its periphery extend into the U-shaped recording member, and the disc carries a plurality of electromagnetic elements about its periphery. Each of the electromagnetic elements has a varying electrical signal applied to it, and the magnetic flux in these elements will consequently vary in accordance with this signal. Each of these elements includes a core which, upon rotation of the disc, is sequentially aligned with the pairs of magnetic laminations of the recording member to form a series of magnetic circuits each including the core, the pair of laminations, and the portion of the tape bridging the gap between the pair of laminations.

The several elements on the disc are spaced a distance substantially equal to the width of the tape, the arrangement being such that when the tape is fed past the recording member and the disc is rotated, the elements will sequentially traverse the U-shaped recording member and each element will sequentially form the series of magnetic circuits and induce in the latter a magnetic flux whose intensity, in any given lamination, will correspond to the strength of the electrical signal applied to the element at the instant it sweeps past the particular pair of laminations.

This action results, in effect, in the scanning of the tape in a series of parallel lines or sweeps and in the local magnetization of the tape along such lines or sweeps, in accordance with the electrical signal applied to the apparatus. Thus, there will be produced in the tape a magnetic image of the signal, which usually will correspond to a magnetic image or replica of an original image, such as might be scanned by a photocell.

The invention will be more fully understood from the following detailed description thereof and the accompanying drawings wherein.

Figures 1, 2, 3, 4, 5, 6:
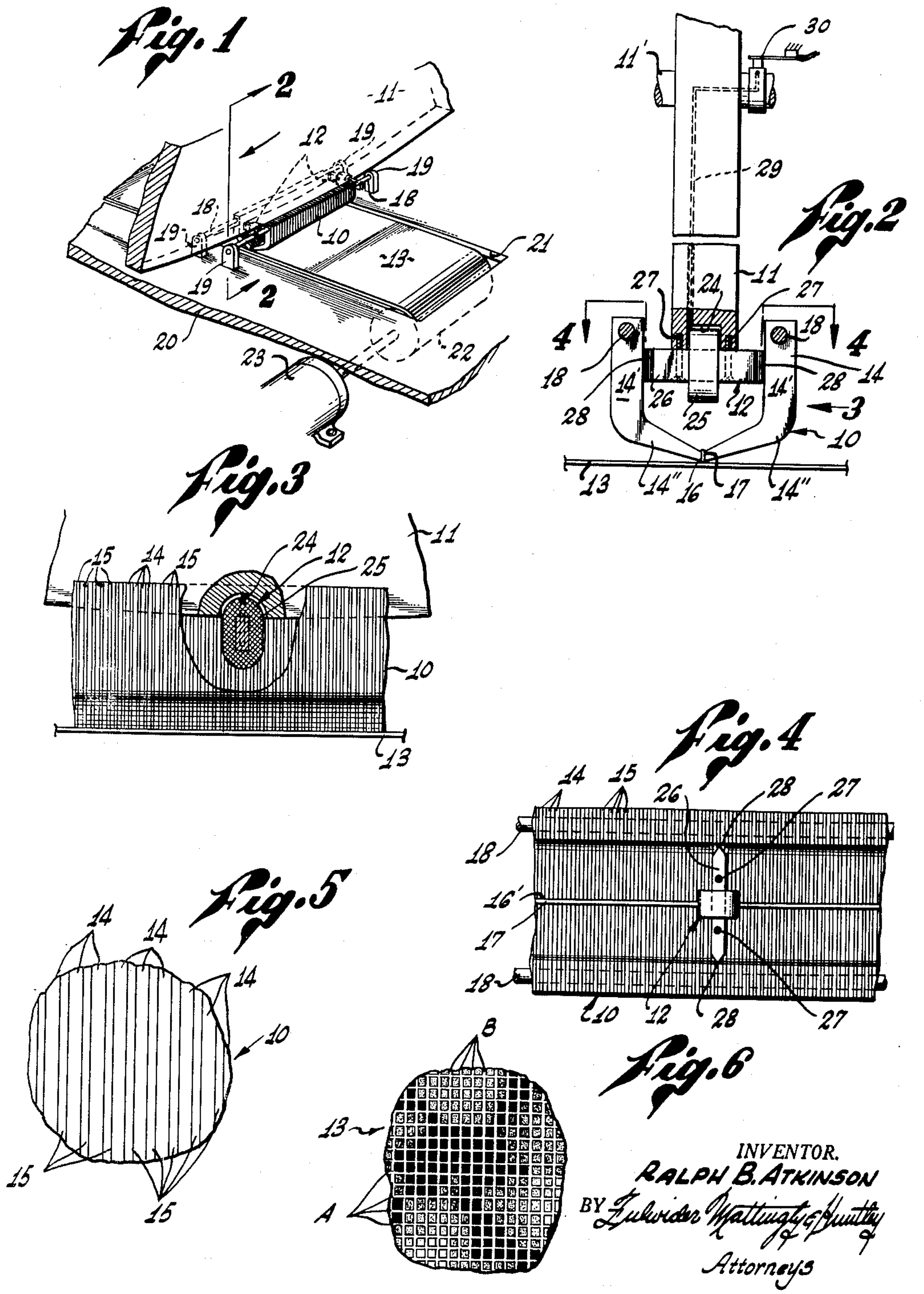
FIGURE 1 is a partial perspective view of the recording apparatus of the invention with one of the electromagnetic elements on the rotatable disc shown at the instant of its emergence from the U-shaped recording member and the following element shown at the instant of its entrance into the member.
FIGURE 2 is an enlarged section taken substantially along line 2—2 of FIGURE 1 showing the details of one of the electromagnetic elements at the instant of its sweeping past one of the pair of magnetic laminations comprising the recording member.
FIGURE 3 is a view looking at the present recording apparatus in the direction of the arrow indicated by the numeral 3 in FIGURE 2, parts being broken away for the sake of clarity.
FIGURE 4 is a view looking in the direction indicated by the arrows on line 4—4 of FIGURE 2.
FIGURE 5 is an enlarged detail view showing the laminated construction of the recording member.
FIGURE 6 is an enlarged view of a magnetic tape after a magnetic image, produced in the tape by the present recording apparatus, has been rendered visible.

Reference is now had to FIGURE 1 wherein 10 denotes an elongated stationary recording member which is generally U-shape in transverse cross-section, as shown. The numeral 11 denotes a rotary disc which carries at its periphery a plurality of electromagnetic elements 12, the disc being disposed in a plane passing midway between and parallel to the legs of the U-shaped recording member.

Electromagnetic elements 12 are adapted to have applied thereto a varying electrical signal such as might be generated by the scanning of an object with a photocell, as previously mentioned, so that the magnetic flux in the elements will vary in accordance with the variations in said signal. When disc 11 is driven in rotation from a suitable driving shaft indicated at 11' (FIGURE 2), elements 12 will sequentially traverse the recording member 10 to produce in a magnetic tape 13, or the like, a magnetic image corresponding to the elecrtical signal applied to the elements, all in a manner to be presently more fully described.

As shown more clearly in FIGURES 3 through 5, the recording member 10 is composed of a plurality of transversely extending thin laminations 14, of magnetic material such as iron or a suitable magnetic alloy of high permeability, which are alternated with non-magnetic laminations 15 formed of a suitable material such as brass.

Referring now to FIGURE 2, it will be seen that each of the magnetic laminations 14 comprises a pair of generally L-shaped elements having legs 14' disposed substantially normal to tape 13 and legs 14'' inclined downwardly toward the tape. The legs 14'' are tapered toward their tips, as shown, and the latter are slightly spaced to provide a narrow gap 16. The non-magnetic laminations 15 are similarly shaped and the gaps in the several laminations are aligned so as to form a gap extending the length of the recording bar as indicated by 16' in FIGURE 4. For reasons of mechanical strength, etc. I prefer to place a strip 17 of a non-magnetic material such as brass in the gap 16.

The magnetic and non-magnetic laminations 14 and 15 may be apertured, as shown in FIGURES 1 and 2, and supported on a pair of non-magnetic support rods 18, the latter having their opposite ends fixed in raised lugs 19 formed on a supporting structure 20. The several laminations 14 and 15 are preferably bonded together and fixed against axial movement on the support rods 18 as by a suitable adhesive or by clamping means (not shown).

The supporting structure 20 is spaced a slight distance from the recording member 10, and the magnetic tape 13 passes between the support 20 and member 10, being fed from a supply reel (not shown) to a take-up reel 22 driven by an electric motor 23. The arrangement is such that gap 16' in the recording member 10 extends transversely of the tape 13 and the latter bears against the member in a manner to bridge the gap, as seen in FIGURE 2.

The disc 11 is preferably made of a non-magnetic material, such as aluminum or some type of plastic and is formed with a plurality of recesses 24 about its periphery (FIGURES 2 and 3). Disposed in these recesses are the electromagnetic elements 12 which comprise windings 25 each having a core 26 extending therethrough. The electromagnetic elements 12 are fixed to the periphery of disc 11 as by non-magnetic screws 27 (FIGURE 2), and the cores 26 have their opposite ends pointed, as indicated at 28 (FIGURE 4). The length of the cores is such as to afford a very light rubbing contact between the pointed ends 28 thereof and the legs 14' of the laminations 14, as the electromagnetic elements 12 traverse the recording member 10 during rotation of the disc 11. From FIGURE 4 it may be seen that the pointed ends 28 of a given core 26 are arranged to simultaneously contact the separate legs 14' of a given pair of the laminations 14 so that for a clockwise direction of rotation of disc 11, as indicated by the arrow in FIGURE 1, the cores 26 will wipe across the laminations 14 from right to left, as the apparatus is viewed in FIGURE 1.

The magnetic elements 12 are so spaced about the periphery of disc 11 that the distance between adjacent cores 26 is slightly greater than the length of recording member 10. Consequently, as one core 26 emerges from the left hand end of the recording member 10, the following core 26 will be just entering the right hand end of the member, as illustrated in FIGURE 1.

The aforementioned electrical signal to be magnetically recorded on tape 13 may be applied to windings 25 of the electromagnetic elements 12 through leads 29 and a slip ring device 30 (FIGURE 2) or a suitable commutator device (not shown). In those forms of apparatus employing commutator devices, the arrangement is such as to apply the electrical signal only to the winding of that one of the elements 12 which, at any given moment, is traversing the recording member 10, while in those forms employing a slip ring device, such as indicated at 30, the electrical signal is simultaneously applied to the windings 25 of all of the electromagnetic elements 12.

It is believed that the operation of the present ferrographic recording apparatus will be apparent from the foregoing. Thus, the electric motor 23 is energized to feed tape 13 past recording member 10 and onto the take-up reel 22, at a constant linear tape speed. Simultaneously, shaft 11' will be driven to rotate disc 11 at a constant angular velocity.

Upon application of the electrical signal to the apparatus, a magnetic flux will be produced in the windings 25 and cores 26 of the electromagnetic elements 12 which will vary in accordance with the variations in the signal. As a given one of the elements 12 traverses the recording member 10, the opposite ends of the core 26 of that element wipe across the laminations 14 of magnetic material.

Referring to FIGURE 2 it will be seen that at the instant of contact of the legs 14' of a given pair of these laminations by opposite ends 28 of one of the cores 26, there is formed a magnetic circuit from one end of the core, through the legs 14' and 14'' and tip of one of the L-shaped elements comprising that pair of laminations, through the portion of tape 13 bridging the gap 16, through the tip and legs 14' and 14'' of the other L-shaped element of the pair, and then to the other end of the core. The flux induced in this magnetic circuit will be determined by the strength of the electrical signal applied to the elements 12 at the instant of said contact.

Owing to the relatively high reluctance of the gap 16, substantially all of this flux will flow through the portion of the tape 13 bridging the gap. A small area of the tape will thereby be magnetized, such area having one dimension substantially equal to the width of gap 16 and the other dimension substantially equal to the thickness of the laminations 14.

It will be apparent from the foregoing that when tape 13 is fed at a constant linear speed and disc 11 is rotated at a constant angular velocity, the wiping of the cores 26 across the laminations 14 in sequence from one end of the member 10 to the other end will produce in the tape a series of parallel lines or sweeps along which the tape will be locally magnetized in accordance with the variations in the electrical signal. A magnetic image of the electrical signal is thus formed in the magnetic tape or sheet 13, corresponding to a magnetic replica of the original image scanned by the photocell or similar means. This magnetic image may be rendered visible by suitable treatment, as by running the tape through a magnetic ink solution. Since the magnetic particles contained in the ink will adhere only to the magnetized portions of the tape, the resultant pattern of such particles will correspond to the magnetic image. The image will be shaded in accordance with the varying magnetization in the tape due to magnetic particle accumulations of greater or lesser density.

An enlarged portion of the tape which has been so treated is illustrated in FIGURE 6 wherein the shaded areas represent the magnetized portions of the tape to which said magnetic particles are held. The horizontal light lines indicated by the letter A result from tape movement between the sweeping of adjacent electromagnetic heads 12 through the recording member 10, while the vertical light lines B result from the spacing of laminations 14 of magnetic material by the insulating laminations 15.

It will be apparent that since the number of lines or sweeps per unit length of tape produced by the present recording apparatus is dependent not only on the angular velocity of disc 11 but also on the number of electromagnetic heads carried by the disc, magnetic images having very fine definition may be produced without resorting to an excessively large diameter disc and an excessive disc speed. Moreover, wear and the possibility of damage to the tape is substantially eliminated inasmuch as it is fed at relatively low speed and is engaged by the stationary recording bar 10 rather than the rapidly moving disc 11.

From the foregoing, it will be seen that I have provided a recording apparatus fully capable of securing the advantages and attaining the objects heretofore set forth. It will be appreciated that many changes may be made in the device, depending upon the use to which it is put. Accordingly, while I have shown and described a preferred form of my invention, I do not wish to be restricted to the particular form or arrangement of parts herein described and shown, except as limited by the following claims.

I claim:

1. A magnetic recording device which includes: a transversely laminated recording member comprising pairs of elements of magnetic material, each pair forming one of said laminations, the elements of each of said pairs being slightly spaced to define a gap, each of said pairs of elements and the gap between the elements thereof forming a portion of a magnetic circuit; electromagnetic means generating magnetic flux and adapted to periodically traverse the entire length of the member for sequentially inducing magnetic flux in each of said circuits; and driving means for driving said electromagnetic means along said member.

2. A magnetic recording device which includes: a recording member comprised of a plurality of laminations of magnetic material spaced longitudinally of said member, each of said laminations including a pair of elements having tips spaced laterally of said member to define a gap, said gaps being aligned longitudinally of the members; electromagnetic means for periodically traversing said member in a longitudinal direction and including coil means energizing core means for sequentially completing a series of magnetic circuits each including said pair of elements of a lamination and the gap therebetween; and driving means for driving said electromagnetic means along said member.

3. A magnetic recording device which includes: an elongated recording member comprised of a plurality of laminations of magnetic material spaced longitudinally of the member, each of said laminations including a pair of elements having tips spaced laterally of said member to define a narrow gap, the several gaps being aligned longitudinally of said member; electromagnetic means adapted to be moved along said member and including coil means energizing core means for sequentially completing a magnetic circuit through each of said laminations in sequence, including said pair of elements and said gap therebetween, said electromagnetic means being adapted to have a varying electrical signal applied thereto whereby a magnetic flux varying in accordance with said signal will be sequentially induced in said circuits; and driving means for moving said electromagnetic means along said member.

4. Apparatus according to claim 3 wherein said driving means comprises a disc carrying said electromagnetic means at its periphery.

5. Apparatus according to claim 4 wherein said electromagnetic means are spaced about the periphery of said disc at distances substantially equal to the length of said recording member.

6. A magnetic recording device which includes: a recording member comprised of a plurality of laminations of magnetic material arranged longitudinally of said member, each of said laminations comprising a pair of generally L-shaped elements arranged to form a generally U-shape, the tips of those legs of the elements defining the base of the U being slightly spaced to form a narrow gap extending longitudinally of said member; electromagnetic means adapted to have a varying electrical signal applied thereto and including coil means energizing core means; and means for periodically moving said coil and core means longitudinally through said recording member to sequentially complete a series of magnetic circuits each including said L-shaped elements of a lamination and the gap therebewteen, and to induce magnetic flux in said circuits in accordance with the instantaneous strength of said signal.

7. Apparatus according to claim 6 wherein said means for moving the armature means comprises a rotatable disc carrying said electromagnetic means at its periphery, and means for driving said disc at a constant angular velocity.

8. Apparatus according to claim 7 wherein said electromagnetic means are spaced equally about the periphery of said disc and the spacing between adjacent electromagnetic means is substantially equal to the length of said recording member.

9. A magnetic recording device comprising: means for supporting and moving a magnetizable record; a recording member extending transversely of said supporting means and the record carried thereby, and comprising pairs of substantially coplanar magnetic circuit elements forming transverse laminations in said member, each of said pair of elements defining a narrow gap and the several gaps being aligned longitudinally of said member, said record bearing against said member in a manner to bridge said gaps, each of said pairs of elements and the portion of said record bridging the respective gaps forming magnetic circuit means; electromagnetic means including coil and core means adapted to traverse the length of the recording member for separately inducing magnetic flux in each of said circuit means in sequence; and means for causing said electromagnetic means to periodically traverse said recording member.

10. A magnetic recording device comprising: means for supporting and moving a magnetizable record; a recording member extending transversely of said supporting means and the record carried thereby and comprising a plurality of laminations of magnetic material arranged transversely of said member, each of said laminations comprising a pair of elements which are spaced laterally of said member to define a narrow gap, said gaps being aligned longitudinally of said member, said record bearing against said member in a manner to bridge said gaps whereby there will be formed a series of magnetic circuit portions each extending from one of said elements through the portion of said record bridging said gap, to the other element of the pair of elements; electromagnetic means adapted to have a varying electrical signal applied thereto and including coil means energizing core means and adapted to traverse the length of said recording member for separately energizing and completing said series of magnetic circuits in sequence and inducing magnetic flux in each of said circuits in accordance with the instantaneous strength of said signal; and means for causing said core to periodically traverse said recording member at a substantially constant velocity which is relatively high with respect to the rate of movement of said record.

11. Apparatus according to claim 10, wherein the thickness of said laminations and the spacing therebetween are relatively small with respect to the width of the tape.

12. Apparatus according to claim 10 wherein said means for causing said core to periodically traverse said member comprises a rotatable disc carrying said electromagnetic means at its periphery.

13. Apparatus according to claim 12 wherein said electromagnetic means are equally spaced about the periphery of said disc, the spacing being substantially equal to the width of the tape.

14. In a magnetic memory device having a recording medium with a plurality of magnetic memory channels thereon, a lower fixed write head portion disposed in fixed position above the recording medium and comprising a plurality of magnetic core portions aligned with the respective channels on the recording medium, an upper write head portion movable along and above the lower head portion and comprising a complementary magnetic core portion positionable in alinement with any one of the lower magnetic core portions, means for moving said upper head portion relative to said lower head portion, and a write coil on said upper core portion.

15. In a magnetic memory device, a write head comprising a lower fixed head portion comprising a plurality of magnetic core portions disposed in operative relation to a recording medium, an upper head portion movable with respect to the lower core portions and comprising a complementary core portion selectively positionable in alinement with any one of the lower core portions, and means for effecting said alignment of the respective upper and lower core portions.

16. In a write head for a magnetic memory device, a magnetic core comprising fixed and movable portions, said fixed portion comprising core segments spaced apart to form a reluctance gap in fixed relation to a recording medium, said movable portion comprising a core segment shaped to complement the segments of said fixed portion and when moved into complementary relation to said first mentioned core segments completing a magnetic circuit, and coil means wound on said movable portion.

17. In a write head for a magnetic memory device, magnetic core means comprising a plurality of fixed core portions and a movable core portion, each fixed core portion comprising core segments spaced to form a reluctance gap in fixed relation to a predetermined area of a recording medium, said movable portion comprising a core segment movable into complementary relation to a selected one of said fixed core portions, said movable portion when complementing a fixed portion completing a magnetic circuit including said gap, and coil means wound on said movable portion.

References Cited in the file of this patent

UNITED STATES PATENTS

| | | |
|---|---|---|
| 2,188,650 | Clark | Jan. 30, 1940 |
| 2,558,187 | Marrison | June 26, 1951 |
| 2,560,474 | Potts | July 10, 1951 |
| 2,641,656 | Dicke | June 9, 1953 |
| 2,698,875 | Greenwood | Jan. 24, 1955 |
| 2,700,588 | Williams | Jan. 25, 1955 |
| 2,773,120 | Masterson | Dec. 4, 1956 |
| 2,831,180 | Hasbrouck | Apr. 15, 1958 |